United States Patent [19]
Hayashi et al.

[11] Patent Number: 6,004,373
[45] Date of Patent: Dec. 21, 1999

[54] METHOD FOR PRODUCING IRON CARBIDE

[75] Inventors: Shoji Hayashi, Inazawa; Yoshiaki Iguchi, Kasugai, both of Japan

[73] Assignees: Shoji Hayashi, Inazawa; Yoshiaki Igushi, Kasugai; Kabushiki Kaisha Kobe Seiko Sho, Kobe, all of Japan

[21] Appl. No.: 08/876,232

[22] Filed: Jun. 16, 1997

[30] Foreign Application Priority Data

Jun. 19, 1996 [JP] Japan ..................................... 8-158620

[51] Int. Cl.$^6$ ............................... C22B 5/14; C01B 31/30
[52] U.S. Cl. ............................... 75/505; 423/439; 75/444
[58] Field of Search ........................ 75/505, 444; 423/439

[56] References Cited

U.S. PATENT DOCUMENTS

| | | | |
|---|---|---|---|
| 5,137,566 | 8/1992 | Stephens, Jr. et al. | 75/507 |
| 5,683,489 | 11/1997 | Hayashi et al. | 75/505 |

FOREIGN PATENT DOCUMENTS

| | | |
|---|---|---|
| 58-11484 | 3/1983 | Japan . |
| 6-37658 | 5/1994 | Japan . |

OTHER PUBLICATIONS

Shoji Hayashi, et al., ISIJ International, vol. 32, 1992, No. 9, pp. 962–971, "Factors Affecting the Sticking of Fine Iron Ores During Fluidized Bed Reduction" Jun.

*Primary Examiner*—Melvyn Andrews
*Attorney, Agent, or Firm*—Oblon, Spivak, McClelland, Maier & Neustadt, P.C.

[57] ABSTRACT

A method for producing iron carbide by bringing iron ore into contact with a reducing gas containing hydrogen and a carbon compound at a high reaction temperature and at a reaction pressure of the atmospheric pressure or more to reduce and carburize the iron ore with the participation of a sulfur component, the method includes measuring the reaction temperature, partial pressure $P(H_2)$ of the hydrogen and partial pressure $P(H_2S)$ of hydrogen sulfide contained in the reducing gas, calculating sulfur activity $a_s$ in the reducing gas from Equation (1) shown below, and adjusting the partial pressure $P(H_2S)$ of the hydrogen sulfide in the reducing gas to obtain $a_s=1.0$ to 2.0 at reaction temperatures of 550° C. and above but less than 650° C., $a_s=0.7$ to 2.0 at 650° C., and $a_s=0.05$ to 1.0 at over 650° C. and up to 950° C.: (1) $a_s=(P(H_2S)/P(H_2))/(P(H_2S)/P(H_2))_E$ where $(P(H_2S)/P(H_2))$ represents the ratio between the partial pressures of $H_2S$ and $H_2$ in the reducing gas and $(P(H_2S)/P(H_2))_E$ is the ratio between the partial pressures of $H_2S$ and $H_2$ in a condition where the reaction of Equation (2) below is in equilibrium: (2) $FeS(s)+H_2(g)=Fe(s)+H_2S(g)$ where (s) and (g) represent solid and gaseous phases, respectively. The method includes controlling the reaction pressure to the atmospheric pressure or more in accordance with the oxidizing gas contained in a reducing gas at a reaction temperature of 650° C. or more.

16 Claims, 4 Drawing Sheets

METHOD FOR PRODUCING IRON CARBIDE

BACKGROUND OF THE INVENTION

This invention relates to a direct iron making technology which utilizes a shaft furnace or a fluidized bed furnace, more particularly, to a method for producing iron carbide ($Fe_xC_y$, x/y=2 to 3) from iron ore efficiently.

Iron carbide has been attracting considerable attention in recent years as a new, high-quality iron source material capable of realizing a new generation of energy-saving iron making technology which produces a smaller amount of carbon dioxide gas. There have been known some methods for producing iron carbide. These include a Stelling method disclosed in U.S. Pat. No. 2,780,537 in which fine iron ore is brought into contact with gas containing carbon monoxide (CO) at a temperature between 400° C. and 900° C., and an Iron Carbide method disclosed in U.S. Pat. No. 4,053,301 in which fine iron ore is reduced by $H_2$ gas at a temperature between 595° C. and 705° C. in a fluidized bed and carburized by a carbon-containing substance at the same time.

In the Iron Carbide method, when the treatment temperature is raised to improve the reduction efficiency, metallic iron produced in a furnace is liable to cause the sticking phenomenon derived from the surface characteristics of the produced metallic iron, making it difficult to ensure the stable operation. In producing sponge iron or iron carbide, there is liable to occur an undesirable phenomenon that pipes are plugged by free carbon or soot caused by precipitation from CO and $CH_4$ in a reducing gas. Another undesirable phenomenon is brittle fracture of a reactor vessel, for example, due to carburizing reaction. To overcome these problems, the operation temperature is kept in a lower range or the concentration of carburizing gases such as CO and $CH_4$ is controlled to be slightly higher than that at which $Fe/Fe_3C$ equilibrium is attained.

Japanese Examined Patent Publication No. 44-14462 discloses a method for suppressing conversion of CO to free carbon or to carbon reactable with iron in the process of sponge iron production. In this method, specifically, 1 to 1000 ppm by volume of sulfur compounds is added to the reducing gas within a temperature range of 426° C. to 816° C.

However, the productivity of the conventional iron carbide producing methods is extremely low. This is because iron carbide is produced at relatively low treatment temperatures and with carburizing gas composition close to the $Fe/Fe_3C$ equilibrium, that is, under conditions undesirable for reducing and carburizing reactions.

In view of these problems, the inventors of this application have studied to improve the productivity of iron carbide, and discovered that it is possible to 1) suppress precipitation of free carbon without hindering iron carbide production; and 2) prevent decomposition of the produced iron carbide by adjusting the activity of sulfur contained in a reducing gas containing hydrogen and a carbon compound and by causing the iron carbide to adsorb sulfur on its surface. Based on this discovery, the inventors succeeded in producing iron carbide at a remarkable high efficiency.

However, there has been yet a problem to be solved. Specifically, the reducing gas usually contains oxidizing gas, such as $H_2O$, $CO_2$. It has been noticed that the oxidizing gas hinders the production of iron carbide, and give adverse influence to the production of iron carbide. Also, it is usually impossible to remove the oxidizing gas from the reducing gas entirely. This requires fine and delicate control of composition of reducing gas in accordance with various reaction conditions, thus impairing the industrial applicability.

SUMMARY OF THE INVENTION

It is an object of the present invention to provide a method for producing iron carbide which has overcome the problems residing in the prior art.

It is another object of the present invention to provide a method for producing iron carbide which makes it possible to suppress precipitation of free carbon and decomposition of iron carbide even at higher temperatures and higher concentration of CO and $CH_4$ than the conventional methods, and produce iron carbide more efficiently.

It is another object of the present invention to provide a method for producing iron carbide which can assure higher industrial applicability.

According to the present invention, a method for producing iron carbide comprises the steps of bringing iron ore into contact with a reducing gas containing hydrogen and a carbon compound at a specified reaction temperature and at a reaction pressure of the atmospheric pressure or more to reduce and carburize the iron ore, the activity of sulfur contained in the reducing gas being controlled in accordance with a reaction temperature to cause sulfur to adhere to a surface of iron carbide.

In this method, the sulfur activity is controlled in accordance with a reaction temperature to cause sulfur to adhere to a surface of produced iron carbide. Accordingly, it is possible to suppress precipitation of free carbon and decomposition of iron carbide, thus realizing stable production of iron carbide.

Also, the reaction pressure is held at the atmospheric pressure or more. The high reaction pressure remarkably reduces the adverse influence of oxidizing gas to the production of iron carbide, and assures higher yield of iron carbide.

Above-mentioned objects and other features and advantages of the invention will be understood upon reading the detailed description of the invention to follow in conjunction with the accompanying drawings.

DETAILED DESCRIPTION OF THE INVENTION

Figure 1:
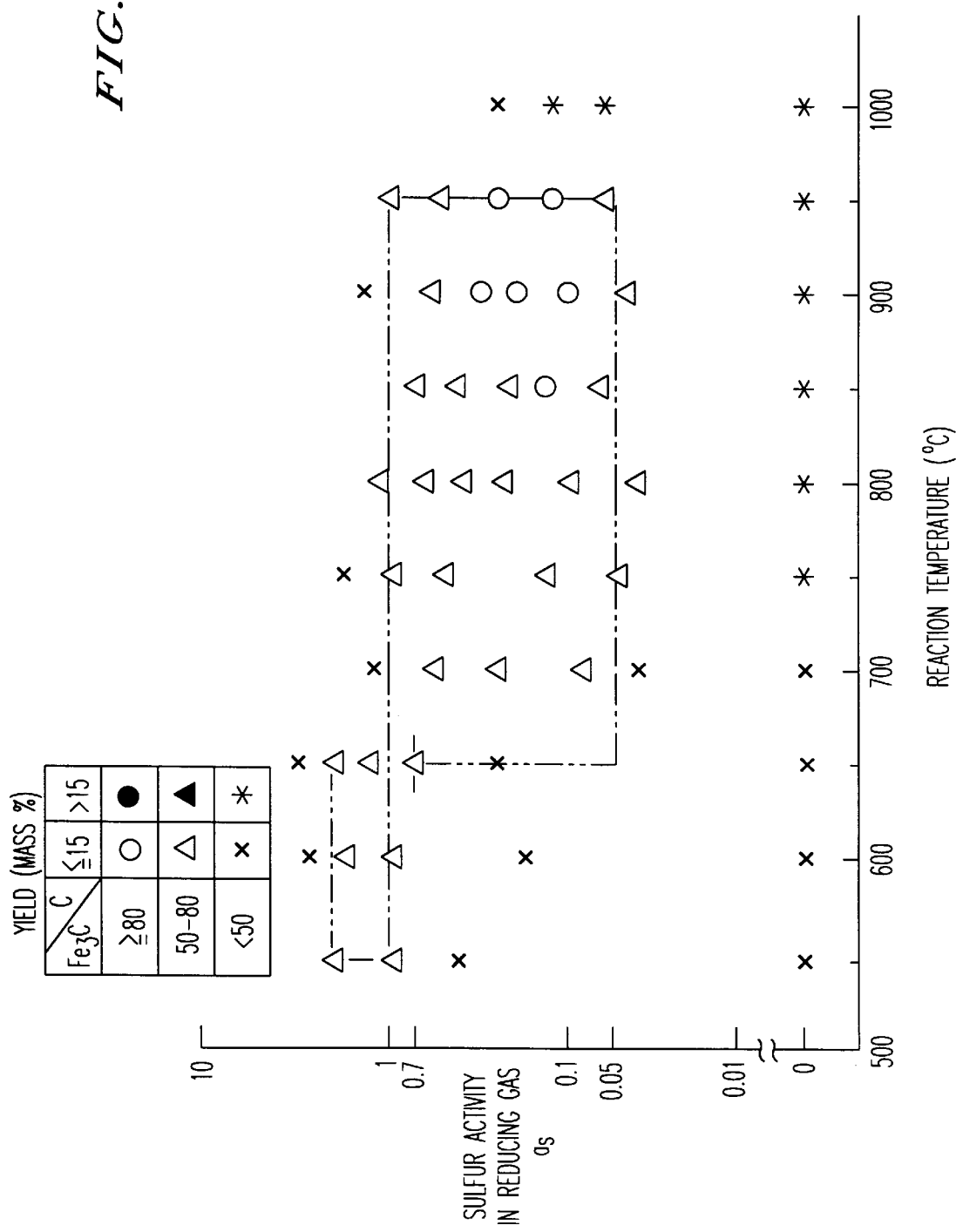
FIG. 1 is a diagram showing preferable and optimum areas obtained when an iron ore is reacted with a $CH_4$—$H_2$—$H_2S$ gas mixture at different levels of sulfur activity.

First of all, described below is how production of iron carbide is accelerated by hydrogen sulfide and how preferable numerical limits of sulfur activity are determined based on the results of experiments using ceramic boats.

Iron ore and coal which is a raw material adapted for producing a reducing gas both contain sulfur compounds in the form of iron sulfides or organic compounds. It is known that a part of these sulfur compounds move into a gaseous phase in the form of hydrogen sulfide $H_2S$ if the reducing gas contains hydrogen. Recent studies have revealed that hydrogen sulfide has considerable effects on the characteristics of metallic iron produced by a reducing process. These effects of hydrogen sulfide are affected by partial pressures and temperatures of the reducing gas. Having studied the reaction process, it has been found that the influence of partial pressures and temperatures can be generally understood as the function of the activity $a_s$ of sulfur contained in the reducing gas, where the sulfur activity $a_s$ is expressed by Equation (1) below:

$$a_s = (P(H_2S)/P(H_2))/(P(H_2S)/P(H_2))_E \quad (1)$$

$(P(H_2S)/P(H_2))$ in Equation (1) represents the ratio between the partial pressures of $H_2S$ and $H_2$ in the reducing gas and $(P(H_2S)/P(H_2))_E$ is the ratio between the partial pressures of $H_2S$ and $H_2$ under a condition where the reaction of Equation (2) below is equilibrium:

$$FeS(s) + H_2(g) = Fe(s) + H_2S(g) \quad (2)$$

According to the invention, hydrocarbon gas (e.g., $CH_4$—$H_2$) which is a main component of natural gas or synthetically generated gas (e.g., CO—$H_2$, $CH_4$—CO—$H_2$) is used in producing iron carbide as a reducing gas which basically contains hydrogen and a carbon compound. Used as a raw iron source is such iron ore as hematite, magnetite or limonite, for instance. Iron oxide contained in the iron ore is converted to magnetite $Fe_3O_4$, wustite FeO and reduced iron Fe and eventually becomes iron carbide $Fe_3C$ through reactions expressed by Equations (3) to (6) below, in which (s) and (g) represent solid and gaseous phases, respectively:

$$3/2Fe_2O_3(s) + 9/2H_2(g) = 3Fe(s) + 9/2H_2O(g)3Fe(s) + CH_4(g) = Fe_3C(s) + 2H_2(g) \quad (3)$$

$$3/2Fe_2O_3(s) + 1/2CO(g) = Fe_3O_4(S) + 1/2CO_2(g)Fe_3O_4(s) + 6CO(g) = Fe_3C(s) + 5CO_2(g) \quad (4)$$

$$3/2Fe_2O_3(s) + 3/2CO(g) = 3FeO(s) + 3/2CO_2(g)3FeO(s) + 5CO(g) = Fe_3C(s) + 4CO_2(g) \quad (5)$$

$$3/2Fe_2O_3(s) + 9/2CO(g) = 3Fe(s) + 9/2CO_2(g)3Fe(s) + 2CO(g) = Fe_3C(s) + CO_2(g) \quad (6)$$

In certain conditions, $Fe_{2.5}C$ and $Fe_2C$ are also produced in addition to $Fe_3C$. Iron carbide is the generic name for various iron-carbon compounds expressed by $Fe_xC_y$ (x/y=2 to 3). Each of the above reactions comprises several elementary reactions. For example, the reactions of Equation (6) are considered to include CO-related elementary reactions as expressed by Equations (7) and (8) below:

$$2CO(g) + \square_{Fe}^C = C(ad) + CO_2(g) \quad (7)$$

$$C(ad) + 3Fe(s) = Fe_3C(S) + \square_{Fe}^C \quad (8)$$

Free carbon precipitates as a result of a side reaction expressed by Equation (9) below:

$$C(ad) + \square_{Fe}^S = C(graphite) \quad (9)$$

In Equations (7) to (9), (ad), (graphite), $\square_{Fe}^C$ and $\square_{Fe}^S$ represent adsorption to the surface of metallic iron, free carbon (soot), secondary adsorption sites for carbon atoms and those for sulfide ion species on the surface of metallic iron, respectively. Since the diameter of a carbon atom is much smaller than that of a sulfide ion, there are more than twice as many secondary adsorption sites $\square_{Fe}^C$ for carbon atoms as secondary adsorption sites $\square_{Fe}^S$ for sulfide ions. It is therefore apparent that there still remain a considerable number of adsorption Sites $\square_{Fe}^C$ even after sulfide ions have been completely adsorbed to the surface of iron.

Table 1 shows values of $(P(H_2S)/P(H_2))E$ in volume ppm calculated from standard free energy changes in the reaction of Equation (2) in a temperature range of 500° C. to 1000° C. It is understood from Table 1 that the higher the reaction temperature, the larger the value of $(P(H_2S)/P(H_2))_E$.

TABLE 1

(The ratio of $H_2S$ to $H_2$ in equilibrium between FeS and Fe)

| Temperature (° C.) | 500 | 600 | 700 | 800 | 900 | 1000 |
|---|---|---|---|---|---|---|
| $(P(H_2S)/P(H_2))_E$ (volume ppm) | 105 | 360 | 940 | 2100 | 3900 | 5830 |

It is known that sulfur existing in a high-temperature reducing atmosphere is completely adsorbed on the surface of iron in accordance with Equation (10) even when the activity as of sulfur contained in the reducing gas is as low as 0.1 because sulfur is a strong surface-active element.

$$H_2S(g) + \square_{Fe}^S = S(ad) + H_2(g) \quad (10)$$

This means that if there exist a certain amount of hydrogen sulfide $H_2S$, sulfur occupies the majority of adsorption sites $\square_{Fe}^S$ leaving few unoccupied adsorption sites $\square_{Fe}^S$. As a result, rapid precipitation of free carbon (C(graphite)) caused by the forward reaction of Equation (9) is suppressed. However, according to the forward reactions of Equations (7) and (8), iron carbide is continuously produced since there remain a sufficient number of carbon atom adsorption sites $\square_{Fe}^C$.

Furthermore, in a condition where chemical adsorption of sulfur on the surface of reduced iron occurs, iron produced through the reduction of iron oxide has a fine porous structure. This porosity increases the specific surface area of the reduced iron, serving to accelerate the forward reactions of Equations (7) and (8). Described above is how hydrogen sulfide $H_2S$ accelerates the production of iron carbide.

Next, the invention will now be described in further detail with reference to results of experiments carried out by using five types of iron ore. They each were in the form of particles of 0.5 mm or less in diameter and their chemical composition (mass %) is shown in Table 2. In carrying out the experiment, a ceramic boat loaded with a specified amount of iron ore was inserted into a horizontal reactor tube of 22 mm in inside diameter.

TABLE 2

(Chemical composition of iron ore (mass %))

| Iron ore | Fe | FeO | $SiO_2$ | $Al_2O_3$ | CaO | S |
|---|---|---|---|---|---|---|
| A | 68.23 | 0.42 | 0.89 | 0.43 | 0.01 | 0.003 |
| B | 62.38 | 0.07 | 4.47 | 2.63 | 0.04 | 0.009 |
| C | 68.10 | 0.13 | 0.94 | 0.51 | 0.04 | 0.002 |
| D | 69.13 | 0.14 | 0.47 | 0.76 | 0.01 | 0.001 |
| E | 57.20 | 0.13 | 5.68 | 2.77 | 0.10 | 0.024 |

The iron ore was reduced and carburized by reacting it at the atmospheric pressure and at temperatures between 550° C. and 1000° C. with specified mixtures of $H_2$ and $CH_4$ gases as well as those of $H_2$ and CO gases. For comparative testing, these gases were introduced into the reactor tube at different ratios.

Specifically, the $CH_4$—$H_2$ mixtures were made by supplying (1) either of $H_2$ and $CH_4$ at 200 cm³/minute, (2) $H_2$ at 200 cm³/minute and $CH_4$ at 100 cm³/minute, and (3) $H_2$ at 200 cm³/minute and $CH_4$ at 50 cm³/minute. The CO—$H_2$ mixtures were made by supplying (1) either of $H_2$ and CO at 200 cm³/minute, and (2) $H_2$ at 200 cm³/minute and CO at 50 cm³/minute. The sulfur activity $a_s$ in each type of reducing gas was adjusted by adding 2 vol % $H_2S$-98 vol % $H_2$ gas mixture into the input gases. An X-ray diffraction analysis proved the existence of iron carbide (mainly $Fe_3C$), free carbon C, metallic iron Fe and wustite FeO.

To evaluate yields of individual reaction processes, concentration (mass %) of these substances were calculated from measured diffraction intensities, in which 100 mass % equals to the total amount of the four substances. Here, the yield of iron carbide $Fe_{2-3}C$ is defined as "the ratio of the mass of iron converted to iron carbide to the total mass of iron contained in a product expressed by mass percent." A product containing large amounts of metallic iron and free carbon is difficult to handle as it is apt to produce dust or ignite. Also, when a product having a low reduction degree is used as iron source, the product requires excessive energy for reduction. For quantitative assessment of the reaction processes, we defined the following two conditions:

(a) "Preferable condition"—This is a condition which provides a maximum iron carbide yield between 50 and 80 mass % and the concentration of free carbon is 15 mass % or less when the maximum iron carbide yield is achieved. (Such conditions are shown by open triangles "Δ" in FIGS. 1 and 2.)

(b) "Optimum condition"—This is a condition which provides a maximum iron carbide yield of 80 mass % or more and the concentration of free carbon is 15 mass % or less when the maximum iron carbide yield is achieved. (Such conditions are shown by open circles "○" in FIGS. 1 and 2.)

Figure 2:
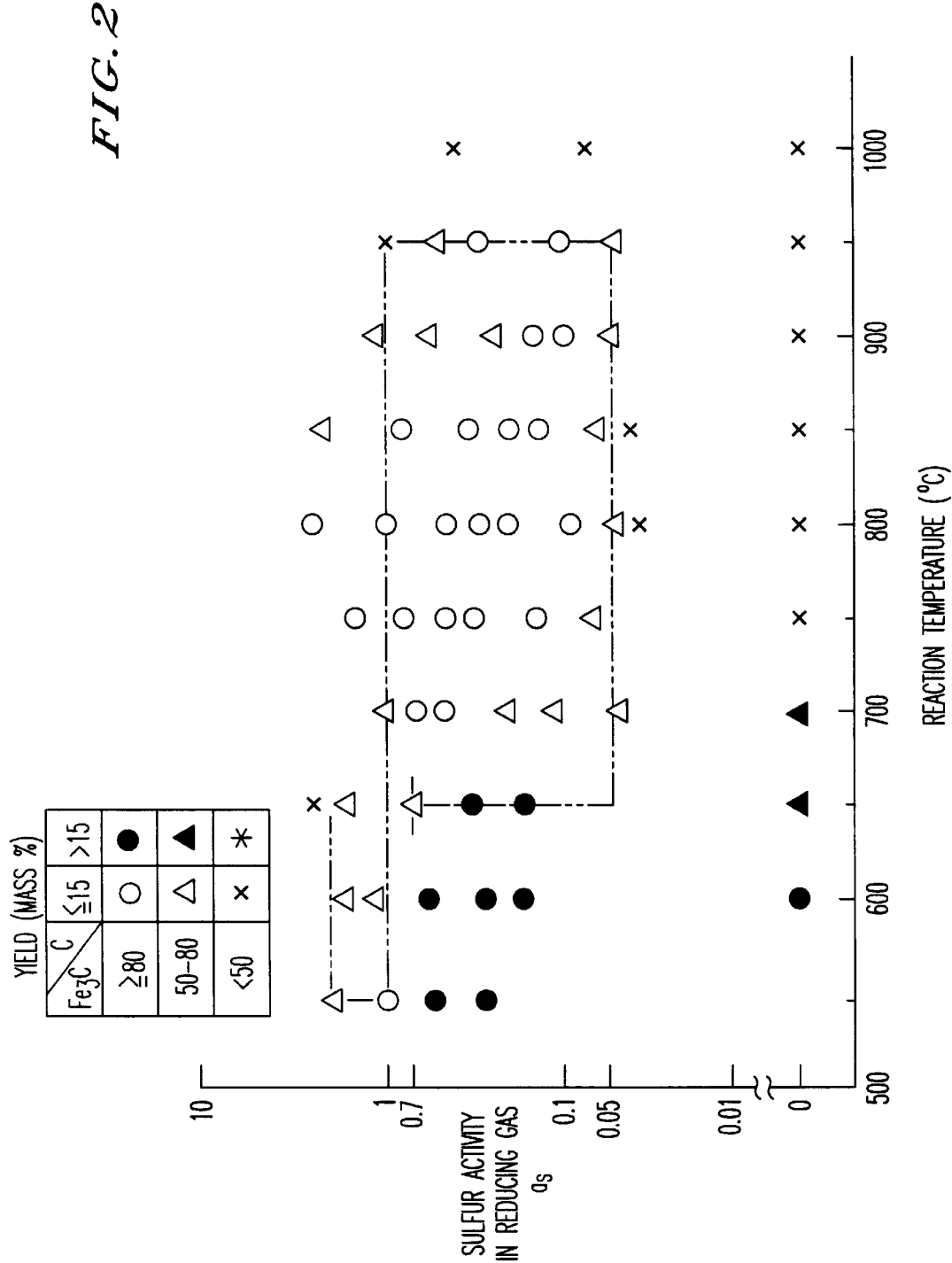
FIG. 2 is a diagram showing preferable and optimum areas obtained when an iron ore is reacted with a CO—$H_2$—$H_2S$ gas mixture at different levels of sulfur activity.

Now, the experimental results are described in detail. FIGS. 1 and 2 are diagrams showing the grading of maximum iron carbide yields (mass %) and free carbon concentration (mass %) obtained when specimens of iron ore were reacted with different $CH_4$—$H_2$—$H_2S$ mixtures and CO—$H_2$—$H_2S$ mixtures, respectively, for one hour at different temperatures and sulfur activities. At reaction temperatures over 650° C. and up to 950° C., the maximum iron carbide yield remained less 50 mass % when $a_s$<0.05 independently of the mixed gas composition (as shown by "X" and "✳" in FIGS. 1 and 2). Although products shown by "Δ" and "○" were obtained when $a_s$>1.0, these products were considered undesirable because they included iron sulfide. At 1000° C., the iron carbide yield did not exceed 40 mass % which corresponds to the saturated carbon concentration of the austenite phase (γ iron) which is stable in the above temperature range.

At reaction temperatures between 550° C. and 650° C., it was required to increase the activity $a_s$ of sulfur contained in reducing gases than at reaction temperatures over 700° C. in order to suppress carbon precipitation. This was because carbon could easily precipitate even at a low partial pressure of CO as shown by the thermodynamic equilibrium. The iron carbide yield exceeded 50 mass % when $a_s$<1.0 at 550° C. and above but less than 650° C. and when $a_s$<0.7 at 650° C. However, the free carbon concentration exceeded 15 mass % (as shown by "●" and "▲" in FIGS. 1 and 2) and extraordinary degradation and swelling (10 to 50 times in volume) were observed in either case. When $a_s$>2.0, harmful sulfur concentration in products exceeded 0.2 mass %. At reaction temperatures below 550° C., it required 10 hours to achieve maximum iron carbide yield, and this was unacceptable.

Referring to FIGS. 1 and 2, products marked by "○" and "Δ" were obtained in areas enclosed by dot-and-dash lines. It can be recognized from FIGS. 1 and 2 that a desirable range of sulfur activity is $1.0 \leq a_s \leq 2.0$ at 550° C. and above but less than 650° C., $0.7 \leq a_s \leq 2.0$ at 650° C., and $0.05 \leq a_s \leq 1.0$ at over 650° C. and up to 950° C. These conditions provided products with low sulfur concentrations of 0.2 mass % or less. Particularly at reaction temperatures over 650° C., the product quality was remarkably excellent with a sulfur concentration of 0.03 mass % or less. It has therefore been found that reaction temperatures over 650° C. and up to 950° C. and a sulfur activity range of $0.05 \leq a_s \leq 1.0$ provide most desirable conditions.

The adjustment of sulfur activity can be made in various ways. If raw iron ore has a sufficiently low sulfur concentration, the sulfur activity in the reducing gas may be adjusted based on partial pressures of $H_2S$ and $H_2$ contained in the input gas. If the sulfur activity in the reducing gas is lower than a specified value, it can be increased by adding at least one of the following substances: thiol (—SH), sulfide (—S—), disulfide (—$S_2$—), thiophen (—CSH) or thiocyanate (—CSN) contained in petroleum or coal, $CS_2$, $H_2S_2$, $(NH_4)_2S$ or any other sulfur compound which produces $H_2S$ in an atmosphere containing hydrogen, or $H_2S$.

Generally speaking, it is desirable to add materials containing these substances, e.g., heavy oil or coal before desulfurization, gases obtained by cracking such heavy oil or coal, iron ore having a high sulfur concentration and iron-containing dust if it is necessary to increase the sulfur activity. When the sulfur activity is too high, on the contrary, the sulfur activity in the reducing gas can be decreased by adding a desulfurizing, agent such as CaO, $CaCO_3$, $Ca(OH)_2$, dolomite or fluorite.

Further, reducing gas is liable to contain oxidizing gases. Specifically, reducing gas principally consisting of $H_2$ and CO or principally consisting of $H_2$, CO, and hydrogen carbide such as $CH_4$ is liable to contain such oxidizing, gases as $H_2O$ or $CO_2$ in production site. As Equations (3) to (6), oxidizing cases come into existence as by-product in the reducingreaction. There is a high likelihood that such oxidizing gases disadvantageously act for production of iron carbide, and decreases the yield of iron carbide.

The inventors has found that even in the case of a considerable amount of oxidizing gas being, contained in the reducing gas, high yield of iron carbide can be attained by carrying out the reducing and carburizing reactions at a pressure of the atmospheric pressure or more.

Next, there will be described in detail with reference to results of experiments in connection with influence of oxidizing gas to production of iron carbide. The experiments were carried out by using ceramic boats. Specific conditions of the experiments are as follows.

Iron ore particle diameter: 0.5 mm or less
Reactor tube: Horizontal Electric Furnance
Weight of iron ore sample: 0.8 g (heated or cooled under nitrogen gas)
Reaction gas: $H_2$—CO mixture (basic gas)
$H_2$/CO=200/200 (cm³/min)
$H_2S/H_2$=2.1×10$^{-4}$
$H_2$—CO mixture added with $H_2O$ and/or $CO_2$ ($H_2$+$H_2O$)/(CO+$CO_2$)=200/200 (cm³/min ) $H_2O$ ratio: $H_2O/(H_2$+$H_2O$)=0 to 0.40 $CO_2$ ratio: $CO_2/(CO+CO_2)$=0 to 0.60
Oxidizing gas concentration:

$(H_2O+CO_2)/(H_2+H_2O+CO+CO_2)=0$ to 0.50 $H_2S/H_2= 2.1\times10^{-4}$

Figure 3:
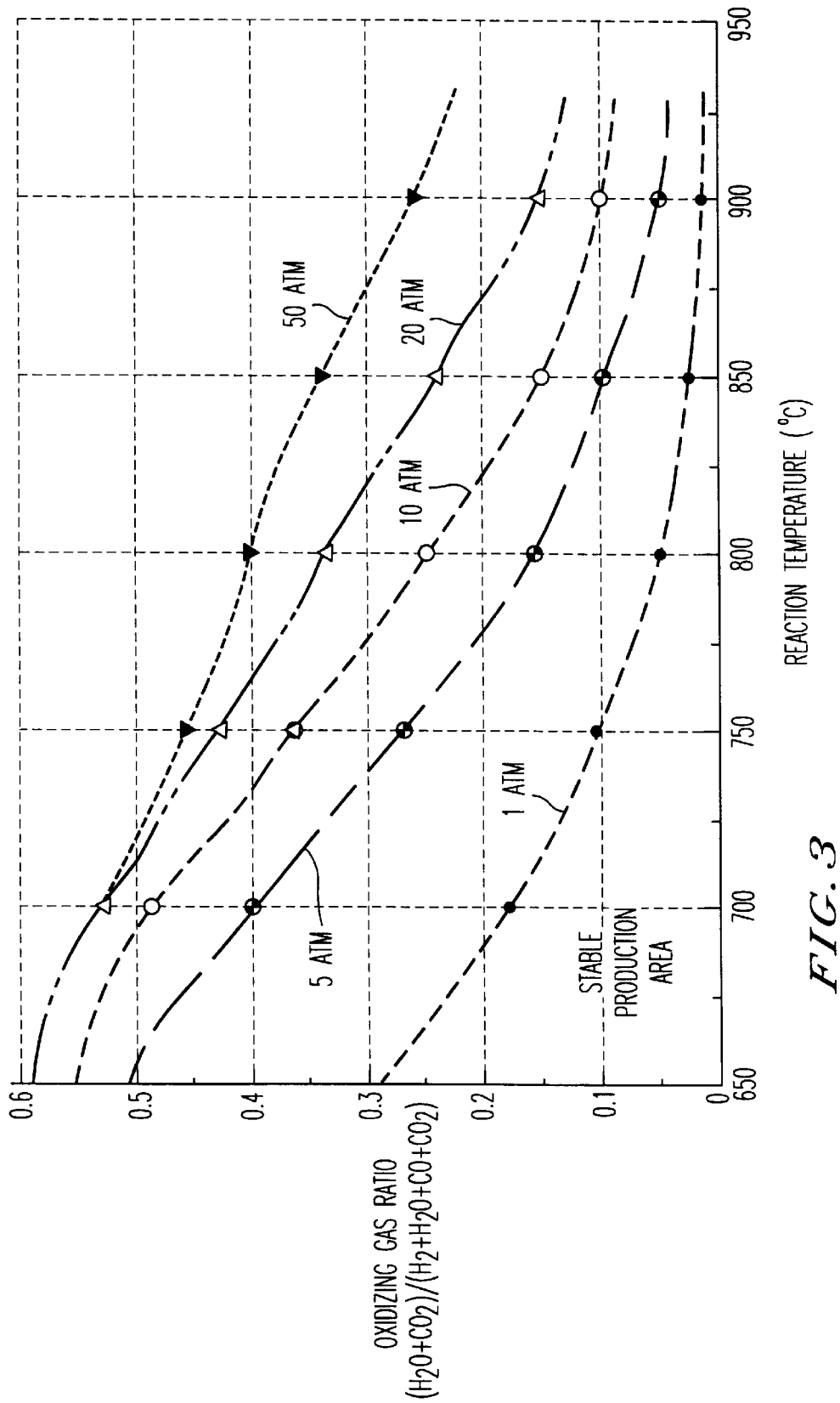
FIG. 3 is a diagram showing a relationship between oxidizing gas allowance limits for producing iron carbide stably and reaction temperatures, a reaction pressure being a parameter.
Figure 4:
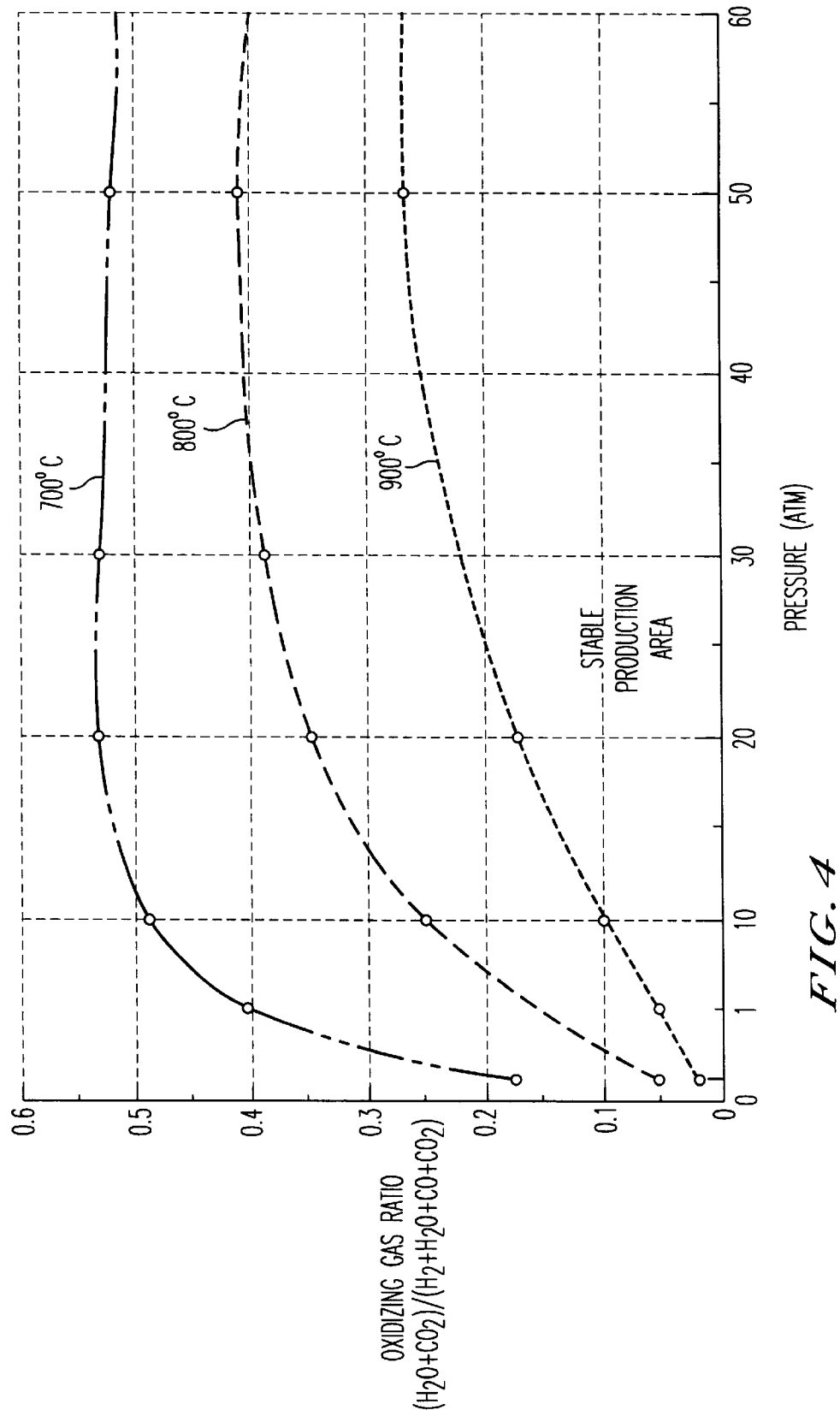
FIG. 4 is a diagram showing a relationship between oxidizing gas allowance limits for producing iron carbide stably and reaction pressures, a reaction temperature being a parameter.

Reaction time: 60 min
Temperature: 650 to 900° C.
Pressure in reactor tube: 1 to 50 atm
Determination of product: X-ray diffraction
Phase of product: $Fe_3C$, $Fe_{2.5}C$, $Fe_2C$, C, Fe, FeO, etc.
Measurement of total carbon concentration and sulfur concentration of product: oxygen burning, method Results of the experiments are shown in FIGS. 3 and 4. These diagrams show relationships between stable production of iron carbide, oxidizing gas ratio, i.e., $(H_2O+CO_2)/(H_2+H_2O+CO+CO_2)$, reaction temperatures and reaction pressures.

In respective diagrams of FIGS. 3 and 4, the "Stable Production Area" represents an area where iron carbide was perfectly produced, and each curve represents a limit of oxidizing gas ratio allowable to assure stable iron carbide production at each reaction condition of temperature and pressure. It will be seen from FIG. 3 that the oxidizing gas allowance limit lowers as the reaction temperature rises. In other words, the adverse influence of oxidizing gas on stable iron carbide production becomes greater as the reaction temperature rises. For example, at the atmospheric pressure, the oxidizing gas allowance limit ratio was about 0.175 at a temperature of 700° C., and about 0.1 at a temperature of 750° C. In the case where the oxidizing gas ratio was above these limits, iron carbide was not perfectly obtained.

However, it will be seen that the oxidizing gas allowance limit ratio rose as the reaction pressure was increased as 5 atm, 10 atm, 20 atm, and 50 atm. At a temperature of 700° C., specifically, the oxidizing gases allowance limit ratio was 0.4 at a pressure of 5 atm, and about 0.5 at a pressure of 10 atm. Comparing to the oxidizing gas allowance limit ratio of 0.175 at the atmospheric pressure, the remarkably high allowance limit ratio was obtainable at the high pressure. In other words, iron carbide could be reliably produced in lower quality reducing gas under the high pressure condition.

The adverse influence of oxidizing gas can be explained to be suppressed under a circumstance of high reaction pressure based on the following reason. Equations (11) and (12) represent reactions involving CO gas.

$$2CO(g)=C(g)+CO_2(g) \quad (11)$$

$$CO(g)+H_2(g)=C(s)+H_2O(g) \quad (12)$$

According to a thermodynamic principle, a reaction preferentially progresses in such a direction that the total number of moles of production gas reduces. In Equations (11) and (12), the high pressure enhances the forward reaction, that is, carburizing reaction.

As shown in FIG. 3, as the reaction pressure was increased, the oxidizing gas allowance limit rose and the iron carbide stable production area expanded. However, as shown in FIG. 4, there was a saturation state where the stable production area did not expand even as the reaction pressure was raised. Specifically, at a temperature of 700° C., the oxidizing gas allowance limit ratio did not rise at about 20 atm or more. At a temperature of 800° C., the oxidizing gas allowance limit ratio did not rise at about 40 atm or more. At a temperature of 900° C., the oxidizing gas allowance limit ratio did not rise at about 50 atm or more.

Accordingly, it will be seen that a reaction pressure of 50 atm or below is practical, and a reaction pressure of 20 atm or less is preferable in consideration of the mechanical strength of a reactor chamber. In the case of adopting the reaction pressure of 20 atm, for example, excellent iron carbide can be reliably produced by controlling the oxidizing gas ratio of the reducing gas in accordance with the oxidizing gas allowance limit ratio curve of 20 atm shown in FIG. 3. e.g., at $(H_2O+CO_2)/(H_2+H_2O+CO+CO_2)=0.53$ or below at the temperature of 700° C.

Further, the inventors carried out to study influence of $H_2O$ and $CO_2$ as the oxidizing gas to production of iron carbide under the previously mentioned experimental conditions, and found that $H_2O$ more adversely influenced the iron carbide production than $CO_2$.

From the viewpoint of the $H_2O$ ratio under the atmospheric pressure, specifically, at the reaction temperature of 700° C., the adverse influence of oxidizing gas to the iron carbide yield was noticeable when the $H_2O$ ratio became greater than 0.07. At the reaction temperature of 750° C., the adverse influence of oxidizing gas to the iron carbide yield was noticeable when the $H_2O$ ratio became greater than 0.03. At the reaction temperature of 800° C., the adverse influence of oxidizing gas to the iron carbide yield was noticeable when the $H_2O$ ratio became greater than 0.02.

From the viewpoint of the $CO_2$ ratio under the atmospheric pressure, on the other hand, at the reaction temperature of 700° C. and 750° C., the adverse influence of oxidizing gas to the iron carbide yield was not seen until the $CO_2$ ratio became 0.30. At the reaction temperature of 800° C., the adverse influence of oxidizing gas to the iron carbide yield was not seen until the $CO_2$ ratio became 0.10. Accordingly, it will be preferable to keep the $H_2O$ ratio below the above-mentioned values for the corresponding temperatures when operating under the atmospheric pressure.

Regarding the sulfur activity $a_s$, which is determined by the partial pressure $P(H_2)$ of hydrogen and the partial pressure $P(H_2S)$ of hydrogen sulfide contained in the reducing gas, further, the inventors confirmed the rise in the reaction pressure gave little influence to the sulfur activity $a_s$. Also, the inventors confirmed the sulfur concentration of produced iron carbide little varied with the change in the reaction pressure.

An optimum reaction time depends on the reaction temperature and pressure, and the composition of reducing gas. Under the previously mentioned conditions, an iron carbide yield of 70 to 80 percent was attained in one to two hours. Accordingly, it can be concluded that a reaction time of around two hours is sufficient to attain the practical yield.

In the foregoing experiments, iron ore particles were used for the production of iron carbide. According to the invention, however, the form and size of iron ore are not limited to the above-mentioned particles. It may be possible to use various-sized particles of iron ore, i.e., larger particle or smaller particles than the particles used in the experiments, and further iron ore formed into pellets or agglomerates having a considerable size. In particular, it should be noted that reducing gas easily enters even larger iron ore material when the reaction pressure is kept at a high level.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method for producing iron carbide comprising:

bringing iron ore into contact with a reducing gas containing hydrogen and a carbon compound at a reaction pressure of 5 atm or more to reduce and carburize the iron ore; and the activity as of sulfur contained in the reducing gas being controlled in accordance with a reaction temperature to cause iron carbide to adsorb sulfur on a surface of the iron carbide, wherein the sulfur activity $a_s$ is controlled by:

measuring a partial pressure $P(H_2)$ of hydrogen and a partial pressure $P(H_2S)$ of hydrogen sulfide contained in the reducing gas;

calculating sulfur activity as in the reducing gas from Equation (1), $$a_s = (P(H_2S)/P(H_2))/(P(H_2S/P(H_2))E \qquad (1)$$

where $(P(H_2S)/P(H_2))$ represents the ratio between the partial pressures of $H_2S$ and $H_2$ in the reducing as and $(P(H_2S)/P(H_2))E$ is the ratio between the partial pressures of $H_2S$ and $H_2$ in a condition where the reaction of Equation (2) below is in equilibrium, $$FeS(s) + H_2(g) = Fe(s) + H_2S(g) \qquad (2)$$

where (s) and (g) represent solid and gaseous phases, respectively; and adjusting the partial pressure $P(H_2S)$ of the hydrogen sulfide in the reducing gas.

2. A method for producing iron carbide according to claim 1, wherein the reaction pressure is 5–50 atm.

3. A method for producing iron carbide according to claim 1, wherein the reducing gas further contains an oxidizing gas, and the reaction pressure is controlled in accordance with the oxidizing gas ratio in the reducing gas.

4. A method for producing iron carbide according to claim 3, wherein the oxidizing gas ratio is defined as $(H_2O+CO_2)/(H_2+H_2O+CO+CO_2)$.

5. A method for producing iron carbide according to claim 4, wherein the iron ore is brought into contact with the reducing gas at a reaction temperature of 650° C. or more and at an oxidizing gas ratio of $(H_2O+CO_2)/(H_2+H_2O+CO+CO_2) \leq 0.6$.

6. A method for producing iron carbide according to claim 1, wherein the sulfur activity $a_s$ is set at:

1.0 to 2.0 at reaction temperatures of 550° C. and above but less than 650° C.;

0.7 to 2.0 at 650° C.;

0.05 to 1.0 at over 650° C. and up to 950° C.

7. A method for producing iron carbide according to claim 1, wherein the iron ore is in the form of one of particles, agglomerates, and pellets.

8. A method of producing iron carbide according to claim 1, wherein the reaction pressure is at least 20 atm.

9. In a method for producing iron carbide comprising:

bringing iron ore into contact with a reducing gas containing hydrogen and a carbon compound to reduce and carburize the iron ore; and the activity $a_s$ of sulfur contained in the reducing gas being controlled in accordance with a reaction temperature to cause iron carbide to adsorb sulfur on a surface of the iron carbide, wherein the sulfur activity as is controlled by:

measuring a partial pressure $P(H_2)$ of hydrogen and a partial pressure $P(H_2S)$ of hydrogen sulfide contained in the reducing gas;

calculating sulfur activity as in the reducing gas from Equation (1), $$a_s = (P(H_2S)/P(H_2))/(P(H_2S)/P(H_2))E \qquad (1)$$

where $(P(H_2S)/P(H_2))$ represents the ratio between the partial pressures of $H_2S$ and $H_2$ in the reducing gas and $(P(H_2S)/P(H_2))E$ is the ratio between the partial pressures of $H_2S$ and $H_2$ in a condition where the reaction of Equation (2) below is in equilibrium, $$FeS(s) + H_2(g) = Fe(s) + H_2S(g) \qquad (2)$$

where (s) and (g) represent solid and gaseous phases, respectively; and adjusting the partial pressure $P(H_2S)$ of the hydrogen sulfide in the reducing gas, the improvement comprising carrying out said method at a reaction pressure of 5 atm or more.

10. A method for producing iron carbide according to claim 9, wherein the reaction pressure is 5 to 50 atm.

11. A method for producing iron carbide according to claim 9, wherein the reaction pressure is at least 20 atm.

12. A method for producing iron carbide according to claim 9, wherein the reducing gas further contains an oxidizing gas, and the reaction pressure is controlled in accordance with the oxidizing gas ratio in the reducing gas.

13. A method for producing iron carbide according to claim 12, wherein the oxidizing gas ratio is defined as $(H_2O+CO_2)/(H_2+H_2O+CO+CO_2)$.

14. A method for producing iron carbide according to claim 13, wherein the iron ore is brought into contact with the reducing gas at a reaction temperature of 650° C. or more and at an oxidizing gas ratio of $(H_2O+CO_2)/(H_2+H_2O+CO+CO_2) \leq 0.6$.

15. A method for producing iron carbide according to claim 9, wherein the sulfur activity as is set at:

1.0 to 2.0 at reaction temperatures of 550° C. and above but less than 650° C.;

0.7 to 2.0 at 650° C.;

0.05 to 1.0 at over 650° C. and up to 950° C.

16. A method for producing iron carbide according to claim 9, wherein the iron ore is in the form of one of particles, agglomerates, and pellets.

* * * * *

UNITED STATES PATENT AND TRADEMARK OFFICE
CERTIFICATE OF CORRECTION

PATENT NO. : 6,004,373

DATED : December 21, 1999

INVENTOR(S): Shoji HAYASHI, et al.

It is certified that an error appears in the above-identified patent and that said Letters Patent is hereby corrected as shown below:

On the title page, item [73] the 2nd Assignees name is misspelled.
Item [73] should read as follows:

[73] Assignees: Shoji Hayashi, Inazawa: Yoshiaki Iguchi, Kasugai; Kabushiki Kaisha Kobe Seiko Sho, Kobe, all of Japan Signed and Sealed this Seventeenth Day of April, 2001

NICHOLAS P. GODICI

*Attest:*

*Attesting Officer*  *Acting Director of the United States Patent and Trademark Office*